(12) United States Patent
Fujiki et al.

(10) Patent No.: US 6,729,304 B2
(45) Date of Patent: May 4, 2004

(54) FUEL INJECTION CONTROL SYSTEM, FUEL INJECTION CONTROL METHOD, AND ENGINE CONTROL UNIT, FOR INTERNAL COMBUSTION ENGINE

(75) Inventors: Yuuji Fujiki, Saitama-ken (JP); Manabu Niki, Saitama-ken (JP); Osamu Takizawa, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/046,750

(22) Filed: Jan. 17, 2002

(65) Prior Publication Data

US 2002/0092506 A1 Jul. 18, 2002

(30) Foreign Application Priority Data

Jan. 18, 2001 (JP) ........................................ 2001/009758

(51) Int. Cl.[7] .................. F02D 41/34; F02D 41/04; F01L 1/34
(52) U.S. Cl. .................... 123/480; 123/90.15; 123/478
(58) Field of Search ............................. 123/90.15, 478, 123/480, 488, 494

(56) References Cited

U.S. PATENT DOCUMENTS

| | | | | |
|---|---|---|---|---|
| 4,499,879 A | * | 2/1985 | Stoltman et al. | 123/480 |
| 5,601,064 A | * | 2/1997 | Fujimoto et al. | 123/491 |
| 6,109,225 A | * | 8/2000 | Ogita et al. | 123/90.15 |

FOREIGN PATENT DOCUMENTS

| | | |
|---|---|---|
| JP | 7-208250 | 8/1995 |
| JP | 9-209818 | 8/1997 |
| JP | 10-331612 | 12/1998 |
| JP | 2000-120430 | 4/2000 |

* cited by examiner

Primary Examiner—Tony M. Argenbright
(74) Attorney, Agent, or Firm—Arent Fox PLLC (57) ABSTRACT

A fuel injection control system including an ECU, for an internal combustion engine which is capable of changing a valve overlap period by changing a cam phase. The ECU calculates a cam phase difference between the present value and the immediately preceding value of the cam phase (amount of change in the valve overlap period), calculates a wall surface temperature of intake ports, and sets a basic fuel injection time period based on an intake pipe absolute pressure and an engine rotational speed. The ECU also calculates a final fuel injection time period by correcting the basic fuel injection time period according to the cam phase difference and wall surface temperature of the intake ports.

16 Claims, 6 Drawing Sheets

FUEL INJECTION CONTROL SYSTEM, FUEL INJECTION CONTROL METHOD, AND ENGINE CONTROL UNIT, FOR INTERNAL COMBUSTION ENGINE

BACKGROUND OF THE INVENTION

1. Field of the Invention

This invention relates to a fuel injection control system, a fuel injection control method, and an engine control unit, for an internal combustion engine which is capable of changing at least one of the cam phase of each intake cam and that of each exhaust cam, relative to a crankshaft of the engine, to thereby change a valve overlap period during which both the intake valve and the exhaust valve are open, the fuel injection control system controlling the amount of fuel injected into the engine.

2. Description of the Prior Art

Conventionally, a fuel injection control system of the above-mentioned kind was proposed e.g. by Japanese Laid-Open Patent Publication (Kokai) No. 2000-179381. The engine incorporating the disclosed fuel injection control system includes a cam phase change mechanism. The cam phase change mechanism is of a hydraulically driven type which is supplied with hydraulic pressure so as to change a cam phase, which is indicative of an amount of advancement of an intake cam shaft relative to an exhaust cam shaft, such that the cam phase becomes equal to a target cam phase. In the process, since the cam phase change mechanism is hydraulically driven, the cam phase does not change instantaneously, but changes progressively toward the target cam phase with a response delay. To overcome the problems resulting from this response delay, in this fuel injection control system, when the engine is in a transitional operating condition from a high-load operation to a low-load operation during deceleration, an injection amount-increasing coefficient for increasing the fuel injection amount is calculated in the following manner: An actual load on the engine is calculated based on the intake pipe pressure, and a target load on the same is calculated based on the opening degree of a throttle valve and the rotational speed of the engine. Then, it is determined based on the difference between the calculated actual load and target load whether or not the engine is in a transitional operating condition from a high-load operation to a low-load operation. Further, it is determined whether or not the cam phase is in a transitional state for decreasing toward the target cam phase for the low-load operation of the engine (i.e. changing in a retarding direction). If the engine and the cam phase are both in the respective transitional condition and transitional state, the injection amount-increasing coefficient is calculated, based on the engine rotational speed, the actual load, and the cam phase, according to an increase in the amount of intake air. Then, an increase in the fuel injection amount is controlled by using the injection amount-increasing coefficient. Thus, the problems caused by the delay in response of the cam phase change mechanism, including a stall and a misfire of the engine, are prevented, and stable combustion is maintained.

In the above internal combustion engine, the response delay of the cam phase change mechanism causes the cam phase to continuously decrease toward the target cam phase in the retarding direction even during an intake stroke, to thereby reduce the valve overlap period during the intake stroke, whereby an internal EGR amount (remaining gas quantity) is reduced. As a result, the temperature of an air-fuel mixture falls, resulting in a decrease in the temperature of the wall surface of intake ports, which causes an increase in the amount of fuel adhering to the wall surface of the intake port. Further, the decrease in the valve overlap period means an increase in a substantial or effective valve-opening time period of the intake valve, which causes an increase in the amount of intake air. The above changes in the state of the air-fuel mixture within a combustion chamber are conspicuous especially when the difference between the cam phase and the target cam phase is large. In the above fuel injection control system, however, since the injection amount-increasing coefficient is calculated simply based on the engine rotational speed, the actual load, and the cam phase, the fuel injection amount cannot be properly controlled in response to the changes in the state of the air-fuel mixture caused by the continuous decrease in the cam phase in the retarding direction during the intake stroke, which causes deviation of the air-fuel ratio of the air-fuel mixture from a target air-fuel ratio. This can result in a lowered engine output, increased emissions and decreased fuel economy, and hence makes it impossible to provide adequate engine performance. Further, the above-described conventional fuel injection control system performs the above control only when the cam phase is on the decrease, but cannot perform control when the cam phase is on the increase.

SUMMARY OF THE INVENTION

It is an object of the invention to provide a fuel injection control system, a fuel injection control method, and an engine control unit, for an internal combustion engine which is capable of accurately controlling the fuel injection amount in response to a change in a valve overlap period due to a change in a cam phase, thereby ensuring excellent engine performance.

To attain the above object, according to a first aspect of the present invention, there is provided a fuel injection control system for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine.

The fuel injection control system according to the first aspect of the invention is characterized by comprising:

valve overlap change amount-detecting means for detecting an amount of change in the valve overlap period;

wall surface temperature-detecting means for detecting a wall surface temperature of the intake ports;

operating condition-detecting means for detecting operating conditions of the engine;

fuel injection amount-setting means for setting a fuel injection amount according to the detected operating conditions; and fuel injection amount-correcting means for correcting the set fuel injection amount according to the detected amount of change in the valve overlap period and the detected wall surface temperature of the intake ports.

In this fuel injection control system, when the valve overlap period is changed due to a change in the cam phase, the fuel injection amount is set according to the detected operating conditions of the engine, and then the fuel injection amount thus set is corrected according to the amount of change in the valve overlap period and the wall surface temperature of the intake ports. In this case, the amount of change in the valve overlap period is a parameter in which changes in an internal EGR amount and the amount of intake air due to the change in the valve overlap period are reflected, while the wall surface temperature of the intake ports is a parameter in which a change in the amount of fuel adhering to the wall surface of the intake port, due to the change in the valve overlap period is reflected. Therefore, by correcting the fuel injection amount according to these parameters, it is possible to accurately control the fuel injection amount by reflecting the changes in the internal EGR amount, the amount of intake air, and the amount of fuel adhering to the wall surface, due to a continuous or progressive change in the valve overlap period, whereby appropriate engine performance dependent on the actual state of an air-fuel mixture within the combustion chamber can be achieved. It should be noted that throughout the present specification, "detection of the amount of change in the valve overlap period" and "detection of the wall surface temperature of the intake ports" include not only detections performed directly by sensors, but also estimations by arithmetic operations.

Preferably, the fuel injection control system further comprises atmospheric pressure-detecting means for detecting an atmospheric pressure, and second fuel injection amount-correcting means for correcting the fuel injection amount according to the detected atmospheric pressure.

In general, with a change in the atmospheric pressure, back pressure on the exhaust side of the engine changes, which causes a change in the amount of gas remaining in the combustion chamber and a resultant change in the amount of intake air. In short, the atmospheric pressure is a parameter in which the change in the amount of intake air is reflected. According to this preferred embodiment, the fuel injection amount is corrected according to the atmospheric pressure, whereby the fuel injection amount can be properly calculated by reflecting the change in the amount of intake air due to the change in the atmospheric pressure. This enables further accurate control of the fuel injection amount.

Preferably, the fuel injection amount-correcting means corrects the fuel injection amount such that when the amount of change in the valve overlap period shows an increase in the valve overlap period, the fuel injection amount is reduced, whereas when the amount of change in the valve overlap period, shows a decrease in the valve overlap period, the fuel injection amount is increased.

When the valve overlap period is on the increase, the internal EGR amount is increasing and the amount of intake air is decreasing, and when the valve overlap period is on the decrease, the internal EGR amount is decreasing and the amount of intake air is increasing. According to this preferred embodiment, when the amount of change in the valve overlap period shows an increase in the valve overlap period, the fuel injection amount is corrected such that it is decreased, which enables more accurate control of the fuel injection amount. On the other hand, when the amount of change in the valve overlap period shows a decrease in the valve overlap period, the fuel injection amount is corrected such that it is increased, which also enables more accurate control of the fuel injection amount.

To attain the above object, according to a second aspect of the invention, there is provided a fuel injection control system for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine.

The fuel injection control system according to the second aspect of the invention is characterized by comprising:
  a valve overlap change amount-detecting module for detecting an amount of change in the valve overlap period;
  a wall surface temperature-detecting module for detecting a wall surface temperature of the intake ports;
  an operating condition-detecting module for detecting operating conditions of the engine;
  a fuel injection amount-setting module for setting a fuel injection amount according to the detected operating conditions; and
  a fuel injection amount-correcting module for correcting the set fuel injection amount according to the detected amount of change in the valve overlap period and the detected wall surface temperature of the intake ports.

According to the second aspect of the invention, the same advantageous effects as provided by the first aspect of the invention can be obtained.

Preferably, the fuel injection control system further comprises an atmospheric pressure-detecting module for detecting an atmospheric pressure, and a second fuel injection amount-correcting module for correcting the fuel injection amount according to the detected atmospheric pressure.

According to this preferred embodiment, the same advantageous effects as provided by the corresponding preferred embodiment of the first aspect of the invention can be obtained.

Preferably, the fuel injection amount-correcting module corrects the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

According to this preferred embodiment, the same advantageous effects as provided by the corresponding preferred embodiment of the first aspect of the invention can be obtained.

To attain the above object, according to a third aspect of the invention, there is provided a fuel injection control method for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine.

The fuel injection control method according to the third aspect of the invention is characterized by comprising the steps of:
  detecting an amount of change in the valve overlap period;
  detecting a wall surface temperature of the intake ports;
  detecting operating conditions of the engine;
  setting a fuel injection amount according to the detected operating conditions; and correcting the set fuel injection amount according to the detected amount of change in the valve overlap period and the detected wall surface temperature of the intake ports.

According to the third aspect of the invention, the same advantageous effects as provided by the first aspect of the invention can be obtained.

Preferably, the fuel injection control method further comprises the steps of detecting an atmospheric pressure, and correcting the fuel injection amount according to the detected atmospheric pressure.

According to this preferred embodiment, the same advantageous effects as provided by the corresponding preferred embodiment of the first aspect of the invention can be obtained.

Preferably, the step of correcting the fuel injection amount includes correcting the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

According to this preferred embodiment, the same advantageous effects as provided by the corresponding preferred embodiment of the first aspect of the invention can be obtained.

To attain the above object, according to a fourth aspect of the invention, there is provided an engine control unit including a control program for causing a computer to carry out fuel injection control for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine.

The engine control unit according to the fourth aspect of the invention is characterized in that the control program causes the computer to detect an amount of change in the valve overlap period, detect a wall surface temperature of the intake ports, detect operating conditions of the internal combustion engine, set a fuel injection amount according to the detected operating conditions, and correct the set fuel injection amount according to the detected amount of change in the valve overlap period and the detected wall surface temperature of the intake ports.

According to the fourth aspect of the invention, the same advantageous effects as provided by the first aspect of the invention can be obtained.

Preferably, the program further causes the computer to detect an atmospheric pressure, and correct the fuel injection amount according to the detected atmospheric pressure.

According to this preferred embodiment, the same advantageous effects as provided by the corresponding preferred embodiment of the first aspect of the invention can be obtained.

Preferably, in correcting the fuel injection amount, the program causes the computer to correct the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

According to this preferred embodiment, the same advantageous effects as provided by the corresponding preferred embodiment of the first aspect of the invention can be obtained.

The above and other objects, features, and advantages of the invention will become more apparent from the following detailed description taken in conjunction with the accompanying drawings.

DETAILED DESCRIPTION OF THE PREFERRED EMBODIMENT

Figure 1:
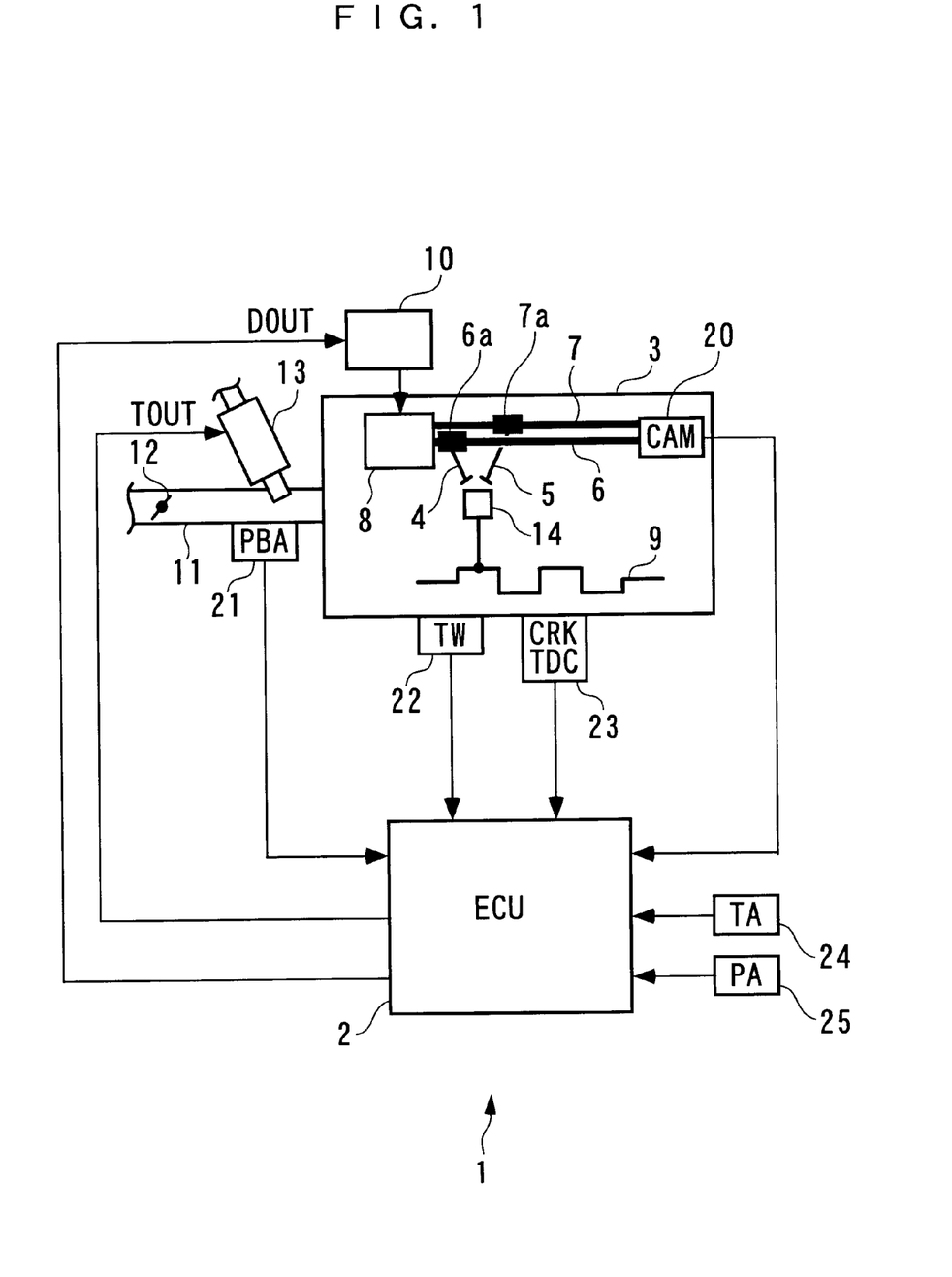
FIG. 1 is a block diagram schematically showing the arrangement of an internal combustion engine incorporating a fuel injection control system according to an embodiment of the invention.

The invention will now be described in detail with reference to drawings showing an embodiment thereof. Referring first to FIG. 1, there is schematically shown the arrangement of a fuel injection control system 1 for an internal combustion engine, according to the embodiment of the invention. As shown in the figure, the fuel injection control system 1 includes an ECU (Electronic Control Unit) 2. The ECU 2 carries out various controls including fuel injection control independence on operating conditions of the internal combustion engine (hereinafter simply referred to as "the engine") 3 as described in detail hereinafter.

The engine 3 is a four-stroke cycle DOHC gasoline engine, which includes an intake camshaft 6 and an exhaust camshaft 7. The intake camshaft 6 has intake cams 6a (only one of which is shown) for opening and closing intake valves 4, while the exhaust camshaft 7 has exhaust cams 7a (only one of which is shown) for opening and closing exhaust valves 5. The intake and exhaust camshafts 6, 7 are connected to a crankshaft 9 by a timing chain, not shown, for rotating through 360 degrees as the crankshaft 9 rotates through 720 degrees. A cam phase change mechanism 8 (VTC) is arranged at one end of the intake camshaft 6.

The cam phase change mechanism 8 is operated by hydraulic pressure supplied thereto, to continuously advance or retard a phase angle (hereinafter simply referred to as "the cam phase") CAIN of the intake cam 6a relative to the crankshaft 9, whereby the opening/closing timing of each intake valve 4 is advanced or retarded. When the opening timing of the intake valve 4 is advanced, a valve overlap period during which both the intake valve 4 and the exhaust valve 5 are open is increased, whereas when the opening timing is retarded, the valve overlap period is decreased.

Further, the cam phase change mechanism 8 is connected to a solenoid control valve 10 which is driven by a drive signal from the ECU 2 for supplying hydraulic pressure from an hydraulic pump, not shown, of a lubricating system, not shown, of the engine 3 to the cam phase change mechanism 8 according to a duty ratio DOUT of the drive signal. This causes the cam phase change mechanism 8 to advance or retard the cam phase CAIN.

A cam angle sensor 20 is arranged at the other end of the intake camshaft 6, opposite to the one end at which the cam phase change mechanism 8 is arranged. The cam angle sensor 20 (valve overlap change amount-detecting means) is comprised e.g. of a magnet rotor and an MRE (magnetic resistance element) pickup, and delivers a CAM signal, which is a pulse signal, to the ECU 2 whenever the intake camshaft 6 rotates through a predetermined cam angle (e.g. one degree).

Further, injectors 13 (only one of which is shown) and an intake pipe absolute pressure sensor 21 are inserted into an intake pipe 11 of the engine 3 at respective locations downstream of a throttle valve 12. The injectors 13 are each arranged in a manner directed toward an intake port, not shown, of each cylinder, not shown, and driven by a drive signal from the ECU 2, to inject fuel toward the intake port. The intake pipe absolute pressure sensor 21 (operating condition-detecting means) formed e.g. by a semiconductor pressure sensor senses an intake pipe absolute pressure PBA within the intake pipe 11, and delivers a signal indicative of the sensed absolute pressure PBA to the ECU 2.

Further, an engine coolant temperature sensor 22 formed e.g. by a thermistor is mounted in a cylinder block of the engine 3. The engine coolant temperature sensor 22 (wall surface temperature-detecting means) senses a temperature (engine coolant temperature TW) of an engine coolant circulating within the cylinder block of the engine 3 and supplies a signal indicative of the sensed engine coolant temperature TW to the ECU 2.

Mounted to the crankshaft 9 of the engine 3 is a crank angle position sensor 23 (valve overlap change amount-detecting means, operating condition-detecting means) which delivers to the ECU 2 a CRK signal and a TDC signal, which are both pulse signals, in accordance with rotation of the crankshaft 9.

Each pulse of the CRK signal is generated whenever the crankshaft rotates through a predetermined angle (e.g. 30 degrees). The ECU 2 determines a rotational speed (hereinafter referred to as "the engine rotational speed") NE of the engine 3, based on the CRK signal, and at the same time calculates the cam phase CAIN, based on the CRK signal and the aforementioned CAM signal from the cam angle sensor 20. The TDC signal indicates that the piston 14 in a cylinder is in a predetermined crank angle position immediately before a top dead center (TDC) position at the start of the intake stroke, and each pulse of the TDC signal is generated whenever the crankshaft rotates through a predetermined angle.

Further, connected to the ECU 2 are an intake air temperature sensor 24 (wall surface temperature-detecting means) and an atmospheric pressure sensor 25 (atmospheric pressure-detecting means). The sensors 24, 25 detect an intake air temperature TA and an atmospheric pressure PA, respectively, and deliver to the ECU 2 respective signals indicative of the sensed intake air temperature TA and atmospheric pressure PA.

The ECU 2 (valve overlap change amount-detecting means, wall surface temperature-detecting means, operating condition-detecting means, fuel injection amount-setting means, fuel injection amount-correcting means, second fuel injection amount-correcting means) is formed by a microcomputer including an I/O interface, a CPU, a RAM and a ROM. The CPU receives the signals from the sensors 20 to 25 via the I/O interface. The ECU 2 determines an operating condition of the engine 3 based on these signals, and sets the duty ratio DOUT of the solenoid control valve 10, the fuel injection time period TOUT over which the injector 13 opens, and so forth, according to a control program stored beforehand in the ROM, and data stored in the RAM. Further, the ECU 2 outputs drive signals indicative of the duty ratio DOUT, the fuel injection time period TOUT, etc. to thereby control the camphase CAIN, the fuel injection, and so forth.

Figure 2:
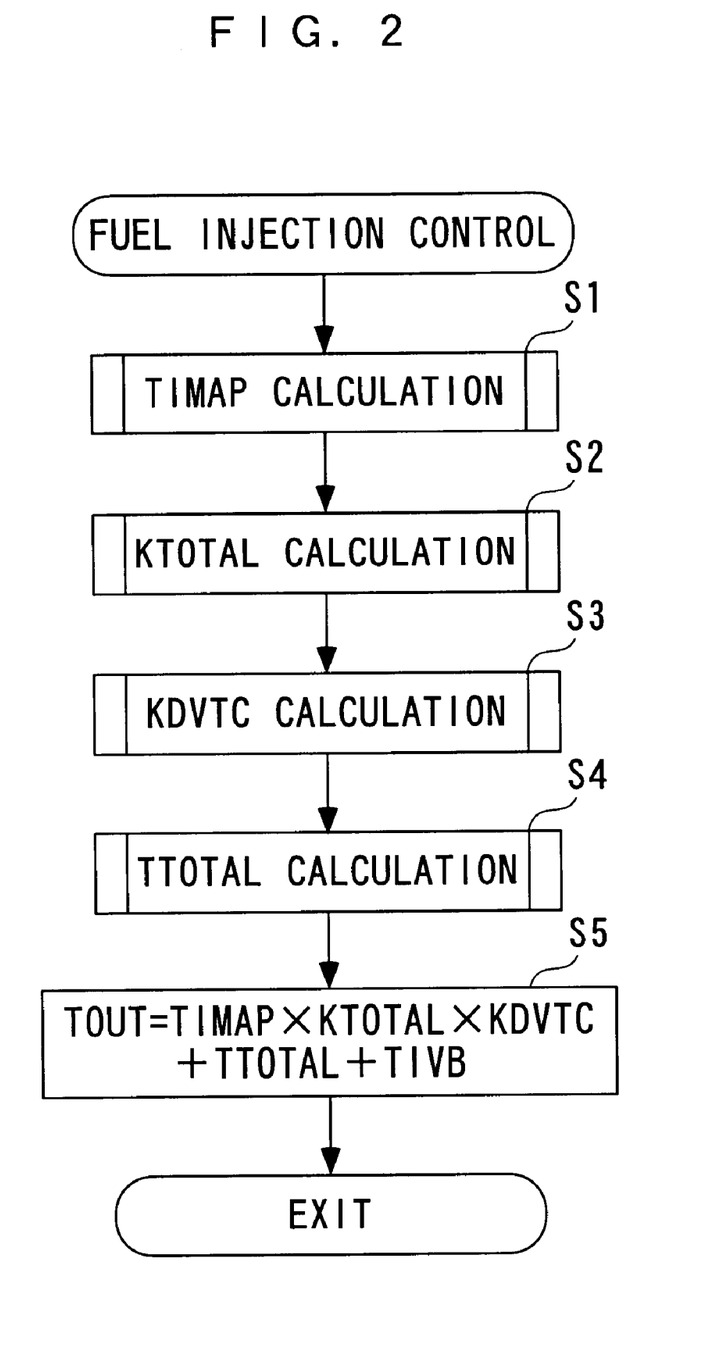
FIG. 2 is a flowchart showing a routine of a fuel injection control process carried out by the FIG. 1 fuel injection control system.

In the following, a fuel injection control process, which is executed by the ECU 2, will be described. FIG. 2 shows a main routine for carrying out the control process, which is executed in synchronism with input of each TDC signal pulse, for calculation of the fuel injection time period TOUT.

As shown in FIG. 2, in the present process, first, in a step S1, a basic fuel injection time period TIMAP (fuel injection amount) is calculated by retrieval from a map, not shown, according to the sensed engine rotational speed NE and intake pipe absolute pressure PBA. In this case, as the map for the retrieval, there are provided e.g. three maps, not shown, including one for use when the cam phase CAIN is in its full retard position, another for use when the cam phase CAIN is in its optimum torque position for obtaining optimum torque, and the other for use when the cam phase CAIN is in its optimum fuel economy position for achieving optimum fuel economy. The optimum torque position and optimum fuel economy position of the cam phase CAIN are set at a time point when the engine 3 has entered a predetermined operating condition after being warmed up. The basic fuel injection time period TIMAP is calculated by retrieving map values from the above maps according to the engine rotational speed NE and the intake pipe absolute pressure PBA, and carrying out interpolation based on the relationship between the actual value of the cam phase CAIN in a cam phase range including the full retard position, the optimum torque position and optimum fuel economy position, and relevant values of the cam phase CAIN of the three positions.

Then, in a step S2, a total correction coefficient KTOTAL is calculated. The total correction coefficient KTOTAL is obtained by multiplying with each other various correction coefficients (e.g. an intake air temperature-dependent correction coefficient KTA, an atmospheric pressure-dependent correction coefficient KPA, and a charging efficiency-dependent correction coefficient KET) which are calculated based on various parameters (e.g. the intake air temperature TA, the atmospheric pressure PA and the engine rotational speed NE) indicative of operating conditions of the engine 3.

Then, in a step S3, aVTC total correction coefficient KDVTC is calculated. The calculation process will be described in detail hereinafter.

Next, in a step S4, a total correction term TTOTAL is calculated. The total correction term TTOTAL is obtained by adding together various correction terms (e.g. an intake air temperature-dependent correction term TTA and an atmospheric pressure-dependent correction term TPA) which are calculated based on various parameters indicative of operating conditions of the engine 3.

Then, in a step S5, the fuel injection time period TOUT is calculated based on results of the calculations in the steps S1 to S4, by using the following equation (1):

$$TOUT = TIMAP \times KTOTAL \times KDVTC + TTOTAL + TIVB \qquad (1)$$

wherein TIVB represents an ineffective time-dependent correction term calculated based on a battery voltage, followed by terminating the program.

Figure 3:
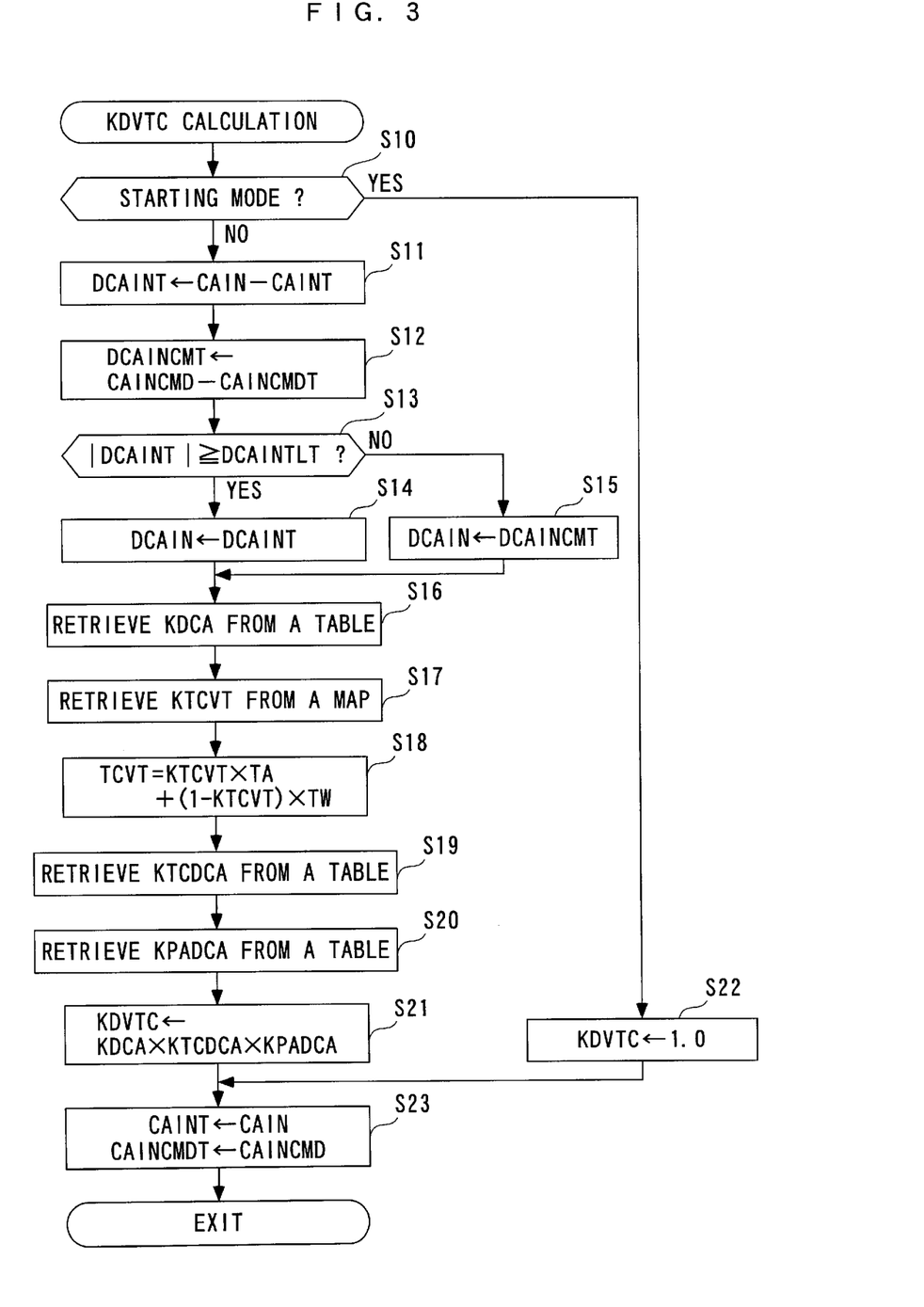
FIG. 3 is a flowchart showing a subroutine for carrying out a step S3 in FIG. 2.

Next, the KDVTC-calculating process executed in the step S3 for calculating the VTC total correction coefficient KDVTC will be described with reference to FIG. 3. In this process, first, it is determined in a step S10 whether or not the engine 3 is in a starting mode. If the answer to the question is affirmative (YES), i.e. if the engine 3 is in the starting mode, the program proceeds to a step S22, wherein and the VTC total correction coefficient KDVTC is set to a value of 1.0, followed by the program proceeding to a step S23, referred to hereinafter. On the other hand, if the answer to the question of the step S10 is negative (NO), i.e. if the engine 3 is in an operating mode other than the starting mode, the program proceeds to a step S11, wherein the difference between the present value CAIN of the cam phase and the immediately preceding value CAINT of the same is calculated as a cam phase difference DCAINT (parameter indicative of the amount of change of the valve overlap time period).

Then, the program proceeds to a step S12, wherein the difference between the present value CAINCMD of a target cam phase and the immediately preceding value CAINCMDT of the same is calculated as a target cam phase difference DCAINCMT. The target cam phase CAINCMD used here is calculated in a calculation process, not shown, by retrieval from a map, not shown, according to the engine rotational speed NE and the intake pipe absolute pressure PBA.

Then, the program proceeds to a step S13, wherein it is determined whether or not the absolute value of the cam phase difference DCAINT calculated in the step S11 is equal to or larger than a predetermined value DCAINTLT. If the answer to the question is affirmative (YES), which means that a change in the cam phase is large, the program proceeds to a step S14, wherein a cam phase change amount DCAIN is set to the cam phase difference DCAINT, followed by the program proceeding to a step S16, referred to hereinbelow.

On the other hand, if the answer to the question of the step S13 is negative (NO), which means that the change in the cam phase is considerably small, the program proceeds to a step S15, wherein the cam phase change amount DCAIN is set to the target cam phase difference DCAINCMT, followed by the program proceeding to the step S16. The cam phase change amount DCAIN is used in fuel injection control as described hereinafter, but when the change in the cam phase is considerably small, the cam phase difference DCAINT is liable to vary, and hence if the cam phase change amount DCAIN is set to the cam phase difference DCAINT in such a state, the fuel injection control inevitably becomes unstable. Therefore, the step S15 is executed to prevent the fuel injection control from becoming unstable.

Figure 4:
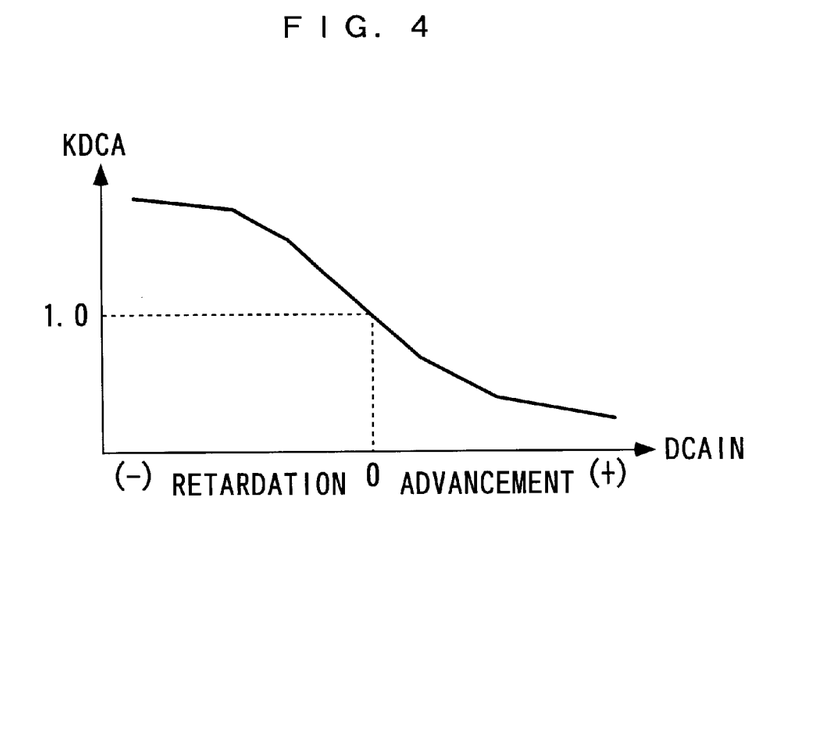
FIG. 4 shows an example of a DCAIN-KDCA table for use in calculating a cam phase change amount-dependent correction coefficient KDCA.

Then, in the step S16, a DCAIN-KDCA table shown in FIG. 4 is looked up according to the cam phase change amount DCAIN, to thereby calculate a cam phase change amount-dependent correction coefficient KDCA.

As shown in the figure, the DCAIN-KDCA table is configured such that a table value of the cam phase change amount-dependent correction coefficient KDCA decreases as the cam phase change amount DCAIN becomes larger. More specifically, when the value of the cam phase change amount DCAIN is equal to 0, the cam phase change amount-dependent correction coefficient KDCA is set to 1.0, and when the same is larger than 0, the correction coefficient KDCA is set to a value smaller than 1.0, while when the same is smaller than 0, the correction coefficient KDCA is set to a value larger than 1.0. The reason for setting the cam phase change amount-dependent correction coefficient KDCA as above is as follows: When the cam phase change amount DCAIN is within a range of the positive values, the internal EGR amount is increased and the amount of intake air is reduced due to an increase in the valve overlap period, and therefore, it is required to correct the fuel injection time period such that it becomes shorter, whereas when the cam phase change amount DCAIN is within a range of the negative values, the internal EGR amount is reduced and the amount of intake air is increased due to a decrease in the valve overlap period, and therefore, it is required to correct the fuel injection time period such that it becomes longer.

Then, the program proceeds to a step S17, wherein an intake air flow velocity KTCVT is calculated by retrieval from a map, not shown, according to the engine rotational speed NE and the intake pipe absolute pressure PBA. Thereafter, the program proceeds to a step S18, wherein a wall surface temperature TCVT of the intake ports (hereinafter referred to as "the port wall surface temperature TCVT") is calculated by using the following equation (2):

$$TCVT = KTCVT \times TA + (1 - KTCVT) \times TW \qquad (2)$$

Figure 5:
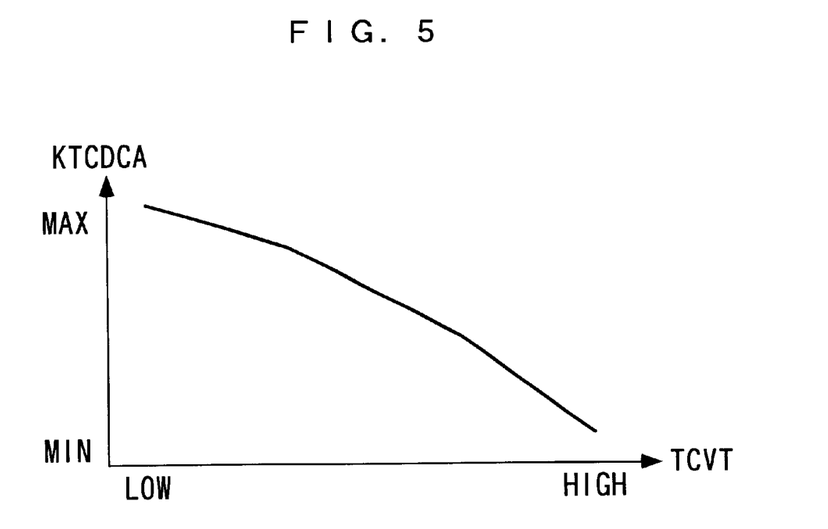
FIG. 5 shows an example of a TCVT-KTCDCA table for use in calculating a port wall surface temperature-dependent correction coefficient KTCDCA.

Then, the program proceeds to a step S19, wherein a TCVT-KTCDCA table shown in FIG. 5 is looked up according to the port wall surface temperature TCVT obtained in the step S18, to thereby calculate a port wall surface temperature-dependent correction coefficient KTCDCA. As shown in the figure, the TCVT-KTCDCA table is configured such that a table value of the port wall surface temperature-dependent correction coefficient KTCDCA decrease as the port wall surface temperature TCVT becomes higher. The reason for setting the correction coefficient KTCDCA as above is as follows: Vaporization of fuel injected toward the intake port is promoted as the port wall surface temperature TCVT becomes higher, so that the amount of fuel adhering to the wall surface of the intake port is reduced, which causes an increase in the amount of fuel flowing into the combustion chamber. Accordingly, it is required to correct the fuel injection time period such that it becomes shorter.

Figure 6:
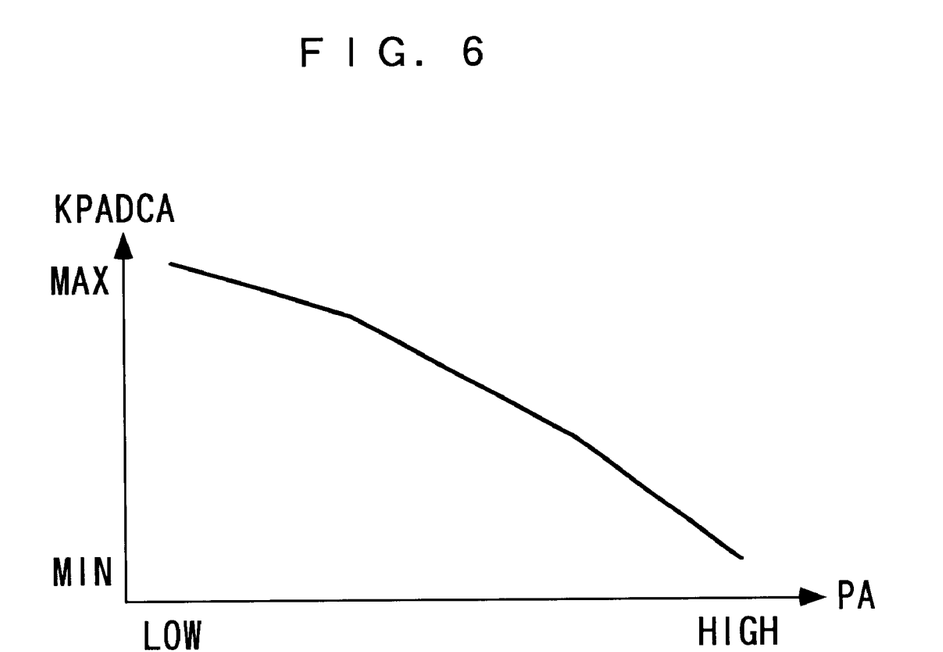
FIG. 6 shows an example of a PA-KPACDCA table for use in calculating an atmospheric pressure-dependent correction coefficient KPADCA.

Then, the program proceeds to a step S20, wherein a PA-KPADCA table shown in FIG. 6 is looked up according to the atmospheric pressure PA to thereby calculate the atmospheric pressure-dependent correction coefficient KPADCA. As shown in the figure, the PA-KPADCA table is configured such that a table value of the atmospheric pressure-dependent correction coefficient KPADCA increases as the atmospheric pressure PA becomes lower. The reason for setting the correction coefficient KPADCA as above is as follows: Back pressure on an exhaust side of the engine falls as the atmospheric pressure PA becomes lower, i.e. as the engine 3 is operating at a higher altitude, so that the amount of gas remaining in the combustion chamber decreases, which causes an increase in the amount of intake air. Accordingly, it is required to correct the fuel injection time period such that it becomes longer.

Then, the program proceeds to a step S21, wherein the VTC total correction coefficient KDVTC is set to the product of the cam phase change amount-dependent correction coefficient KDCA, the port wall surface temperature-dependent correction coefficient KTCDCA and the atmospheric pressure-dependent correction coefficient KPADCA calculated in the respective steps S16, S19 and S20 (KDVTC←KDCA×KTCDCA×KPADCA).

In a step S23 following the step S21 or S22, the present value CAIN of the cam phase is set to an immediately preceding value CAINT, and the present value CAINCMD of the target cam phase to an immediately preceding value CAINCMDT, followed by terminating the program.

Figure 7:
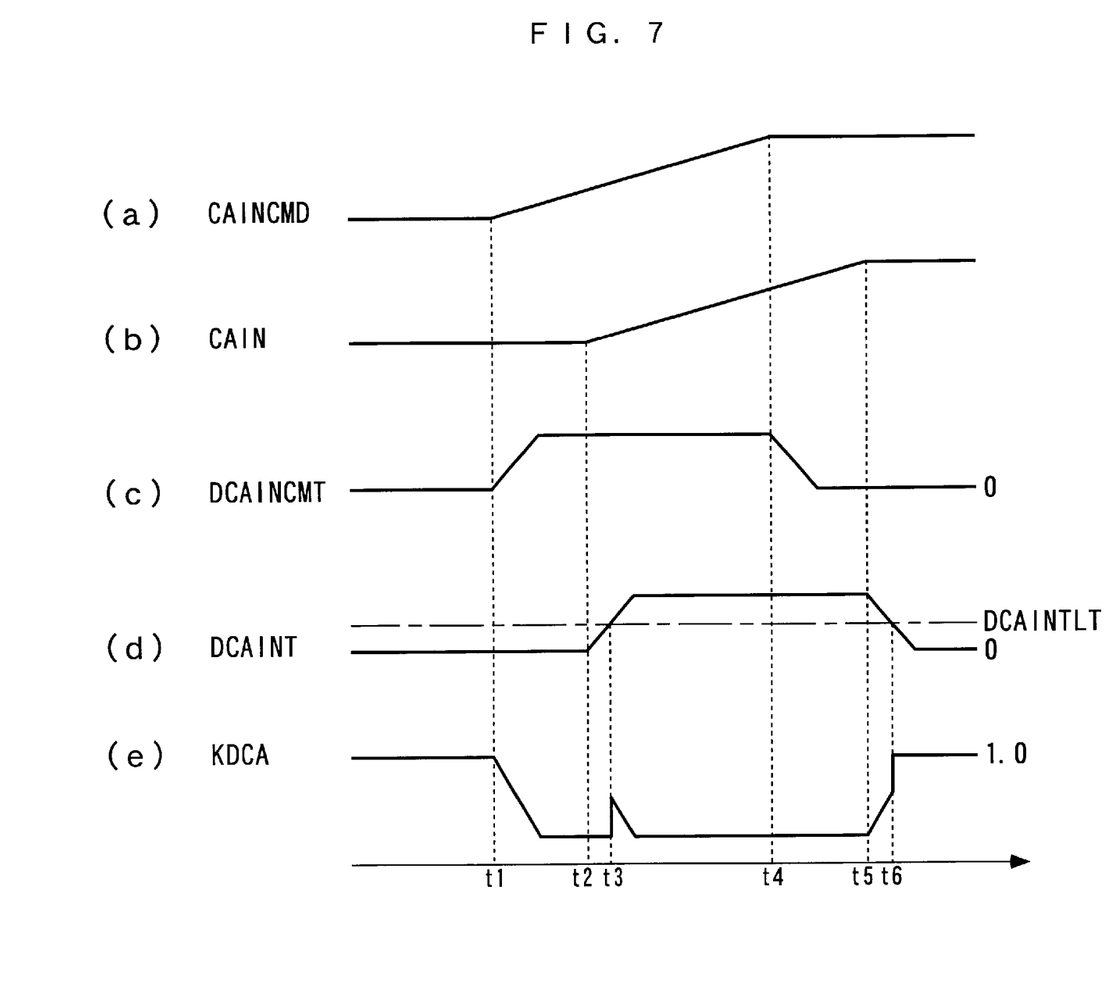
FIG. 7 is a timing chart showing examples of changes in the cam phase change amount-dependent correction coefficient KDCA and other related values during execution of the FIG. 2 control process.

FIG. 7 is a timing chart showing an example of results of the fuel injection control process described above. In the illustrated example, the target cam phase CAINCMD is set such that it is advanced at a constant advancing speed. In the figure, for purposes of ease of understanding, the inclination of each change in each of the target cam phase difference DCAINCMT, the cam phase change amount-dependent correction coefficient KDCA and the cam phase difference DCAINT is shown to be gentler than it actually is.

As shown in the figure, first, when advancement of the target cam phase CAINCMD is started (time t1), the target cam phase difference phase DCAINCMT is calculated accordingly as a positive value within a predetermined range, coefficient KDCA is calculated by retrieval from the FIG 4. table according to the cam phase change amount DCAIN which is set here to the target cam phase difference DCAINCMT (NO to step S13 in FIG. 3), as a value smaller than a value of 1.0 within a predetermined value range. Subsequently, due to a delay in response of the cam phase change mechanism 8, the cam phase CAIN starts advancing at a time t2, i.e. in later timing than the start of the advancement of the target cam phase CAINCMD, and accordingly, the cam phase difference DCAINT starts to be calculated as a positive value.

Then, at a time t3 when the cam phase difference DCAINT has become equal to the predetermined value DCAINTLT, the answer to the question of the step S13 becomes affirmative (YES), and the camphase change amount-dependent correction coefficient KDCA starts to be calculated based on the cam phase difference DCAINT from this time. It should be noted that as shown in FIG. 7, at this time t3, the cam phase change amount-dependent correction coefficient KDCA is set to a considerably increased value since the cam phase difference DCAINT is smaller than the target cam phase difference DCAINCMT. Then, as the cam phase difference DCAINT increases, the correction coefficient KDCA is progressively reduced until the cam phase difference DCAINT and the correction coefficient KDCA start to be calculated as respective constant values. Then, the advancement of the target cam phase CAINCMD is completed (time t4), and accordingly, the target cam phase difference DCAINCMT is calculated as 0. Then, the advancement of the cam phase is completed at a time t5 with a delay from the completion of the advancement of the target cam phase CAINCMD. Accordingly, the cam phase difference DCAINT starts decreasing, and inversely to the above, at a time t6 when the cam phase difference DCAINT has become smaller than the predetermined value DCAINTLT, the cam phase change amount-dependent correction coefficient KDCA starts to be calculated as 1.0.

As described above, during the advancement of the target cam phase CAINCMD, the cam phase change amount-dependent correction coefficient KDCA is held below 1.0, whereby the fuel injection time period TOUT is set to a smaller value. On the other hand, during retardation, not shown in the figure, of the target cam phase CAINCMD, the cam phase change amount-dependent correction coefficient KDCA is held above 1.0, whereby the fuel injection time period TOUT is set to a larger value.

As described above, according to the fuel injection control system 1 of the present invention, the fuel injection time period TOUT is calculated by multiplying the basic fuel injection time period TIMAP, which is calculated based on the engine rotational speed NE and the intake pipe absolute pressure PBA, by the VTC total correction coefficient KDVTC as the product of the cam phase change amount-dependent correction coefficient KDCA, the port wall surface temperature-dependent correction coefficient KTCDCA and the atmospheric pressure-dependent correction coefficient KPADCA.

In the present embodiment, when the absolute value of the cam phase difference DCAINT is equal to or larger than the predetermined value DCAINTLT, the cam phase change amount-dependent correction coefficient KDCA is calculated based on the cam phase difference DCAINT which is a parameter indicative of the amount of change in the valve overlap time period, and hence it is possible to calculate the fuel injection time period TOUT while continuously and properly reflecting changes in the internal EGR amount and the amount of intake air due to the continuous or progressive change in the valve overlap period. In particular, the cam phase change amount-dependent correction coefficient KDCA is set to a smaller value as the cam phase difference DCAINT increases. As a result, as long as the cam phase difference DCAINT is in the range of the positive values, which means the valve overlap period is increased, the fuel injection time period TOUT is properly corrected such that the same becomes shorter in accordance with an increase in the internal EGR amount and a decrease in the amount of intake air. On the other hand, as long as the cam phase difference DCAINT is in the range of the negative values, which means the valve overlap period is decreased, the fuel injection time period TOUT is properly corrected such that the same becomes longer in accordance with a decrease in the internal EGR amount and an increase in the amount of intake air.

Further, the use of the port wall surface temperature-dependent correction coefficient KTCDCA makes it possible to calculate the fuel injection time period TOUT while successively and properly reflecting changes in the port wall surface temperature and hence changes in the amount of fuel adhering to the wall surface of the intake port which are caused by changes in the valve overlap period. Further, the use of the atmospheric pressure-dependent correction coefficient KPADCA makes it possible to calculate the fuel injection time period TOUT while successively and properly reflecting changes in the amount of intake air caused by changes in the atmospheric pressure PA. Thus, the fuel injection amount can be controlled with high accuracy.

Although in the above embodiment, the cam phase CAIN of each intake cam 6a is controlled by the cam phase change mechanism 8, this is not limitative but the cam phase of each exhaust cam 7a relative to the crankshaft 9 may be controlled by the cam phase change mechanism 8. In this case as well, the fuel injection control executed based on the amount of change in the cam phase of the exhaust cam 7a, i.e. the amount of change in the valve overlap period provides the same effects described above. Further, needless to say, the cam phases of the respective intake and exhaust cams 6a, 7a may be both controlled.

It should be noted that parameters indicative of operating conditions of the engine are not limited to the engine rotational speed NE and the intake pipe absolute pressure PBA, but any parameter, such as the intake air temperature TA or the like, indicative of an operating condition of the engine may be employed.

It is further understood by those skilled in the art that the foregoing is a preferred embodiment of the invention, and that various changes and modifications may be made without departing from the spirit and scope thereof.

What is claimed is:

1. A fuel injection control system for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine, the fuel injection control system comprising:
valve overlap change amount-detecting means for detecting an amount of change in the valve overlap period;
wall surface temperature-detecting means for detecting a wall surface temperature of the intake ports;
operating condition-detecting means for detecting operating conditions of the engine;
fuel injection amount-setting means for setting a fuel injection amount according to the detected operating conditions; and
fuel injection amount-correcting means for correcting the set fuel injection amount according to the detected amount of change in the valve overlap period and the detected wall surface temperature of the intake ports.

2. A fuel injection control system according to claim 1, further comprising:
atmospheric pressure-detecting means for detecting an atmospheric pressure; and
second fuel injection amount-correcting means for correcting the fuel injection amount according to the detected atmospheric pressure.

3. A fuel injection control system according to claim 1, wherein said fuel injection amount-correcting means corrects the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

4. A fuel injection control system according to claim 2, wherein said fuel injection amount-correcting means corrects the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

5. A fuel injection control system for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine, the fuel injection control system comprising:
a valve overlap change amount-detecting module for detecting an amount of change in the valve overlap period;
a wall surface temperature-detecting module for detecting a wall surface temperature of the intake ports;
an operating condition-detecting module for detecting operating conditions of the engine;
a fuel injection amount-setting module for setting a fuel injection amount according to the detected operating conditions; and
a fuel injection amount-correcting module for correcting the set fuel injection amount according to the detected amount of change in the valve overlap period and the detected wall surface temperature of the intake ports.

6. A fuel injection control system according to claim 5, further comprising:
an atmospheric pressure-detecting module for detecting an atmospheric pressure; and
a second fuel injection amount-correcting module for correcting the fuel injection amount according to the detected atmospheric pressure.

7. A fuel injection control system according to claim 5, wherein said fuel injection amount-correcting module corrects the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

8. A fuel injection control system according to claim 6, wherein said fuel injection amount-correcting module corrects the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

9. A fuel injection control method for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine, the fuel injection control method comprising the steps of:
detecting an amount of change in the valve overlap period;
detecting a wall surface temperature of the intake ports;
detecting operating conditions of the engine;
setting a fuel injection amount according to the detected operating conditions; and
correcting the set fuel injection amount according to the detected amount of change in the valve overlap period and the detected wall surface temperature of the intake ports.

10. A fuel injection control method according to claim 9, further comprising the steps of:
detecting an atmospheric pressure; and
correcting the fuel injection amount according to the detected atmospheric pressure.

11. A fuel injection control method according to claim 9, wherein the step of correcting the fuel injection amount includes correcting the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

12. A fuel injection control method according to claim 10, wherein the step of correcting the fuel injection amount includes correcting the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

13. An engine control unit including a control program for causing a computer to carry out fuel injection control for an internal combustion engine including intake valves, intake cams for opening and closing the intake cams, respectively, exhaust valves, exhaust cams for opening and closing the exhaust cams, respectively, and a crankshaft connected to the intake cams and the exhaust cams, the engine being capable of changing at least one of a cam phase of each intake cam and a cam phase of each exhaust cam, relative to a crankshaft of the engine, to thereby change a valve overlap period, and causing fuel injection toward intake ports of the engine, wherein the control program causes the computer to detect an amount of change in the valve overlap period, detect a wall surface temperature of the intake ports, detect operating conditions of the internal combustion engine, set a fuel injection amount according to the detected operating conditions, and correct the set fuel injection amount according to the detected amount of change in the valve overlap period and the detected wall surface temperature of the intake ports.

14. An engine control unit according to claim 13, wherein the program further causes the computer to detect an atmospheric pressure, and correct the fuel injection amount according to the detected atmospheric pressure.

15. An engine control unit according to claim 13, wherein in correcting the fuel injection amount, the program causes the computer to correct the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

16. An engine control unit according to claim 14, wherein in correcting the fuel injection amount, the program causes the computer to correct the fuel injection amount such that when the amount of change in the valve overlap period shows an increase in the valve overlap period, the fuel injection amount is reduced, whereas when the amount of change in the valve overlap period shows a decrease in the valve overlap period, the fuel injection amount is increased.

* * * * *